United States Patent [19]
Lycan

[11] Patent Number: 5,915,737
[45] Date of Patent: Jun. 29, 1999

[54] COMPRESSIBLE PIPE SPACER USED IN WELDING

[76] Inventor: Goodwin A. Lycan, 2953 Hinchman Rd., Stevensville, Mich. 49127

[21] Appl. No.: 08/896,409

[22] Filed: Jul. 18, 1997

Related U.S. Application Data

[63] Continuation-in-part of application No. 08/590,075, Jan. 17, 1996, abandoned.

[51] Int. Cl.[6] .............................. B23K 31/02; F16L 13/04
[52] U.S. Cl. ............................ 285/22; 285/288.1; 228/50
[58] Field of Search .................... 285/22, 288.1, 285/187; 228/50

[56] References Cited

U.S. PATENT DOCUMENTS

| | | | |
|---|---|---|---|
| 1,668,297 | 5/1928 | Wuerfel | 29/173 |
| 2,423,848 | 7/1947 | O'Connor | 285/22 |
| 2,681,028 | 6/1954 | Phillips | 285/22 |
| 3,574,377 | 4/1971 | Petitt | 285/22 |
| 4,346,918 | 8/1982 | Lycan | 285/22 |
| 4,505,420 | 3/1985 | Wittenbach | 285/22 |
| 4,593,938 | 6/1986 | Denise et al. | 285/22 |
| 4,674,772 | 6/1987 | Lycan | 285/22 |
| 5,253,507 | 10/1993 | Lycan | 72/414 |
| 5,340,163 | 8/1994 | Merrer et al. | 285/93 |

*Primary Examiner*—Eric K. Nicholson
*Attorney, Agent, or Firm*—Baker & Daniels

[57] ABSTRACT

A split, ring-shaped pipe spacer used to maintain separation between a pipe and a fitting shoulder during welding. The spacer has pairs of yieldable offset segments. The two segments of each pair bulge from the spacer body in opposite directions to maintain proper spacing between the pipe and fitting during welding. The opposing offset segments also permit bidirectional insertion of the spacer into the fitting, position the spacer body out of contact with both the pipe and the fitting, and minute and distribute the stress imparted to the spacer when forming the segments during manufacturing. The spacer ends forming the split in the spacer have a tongue-in-groove shape to accommodate circumferential expansion of the spacer under compression of the pipe.

14 Claims, 5 Drawing Sheets

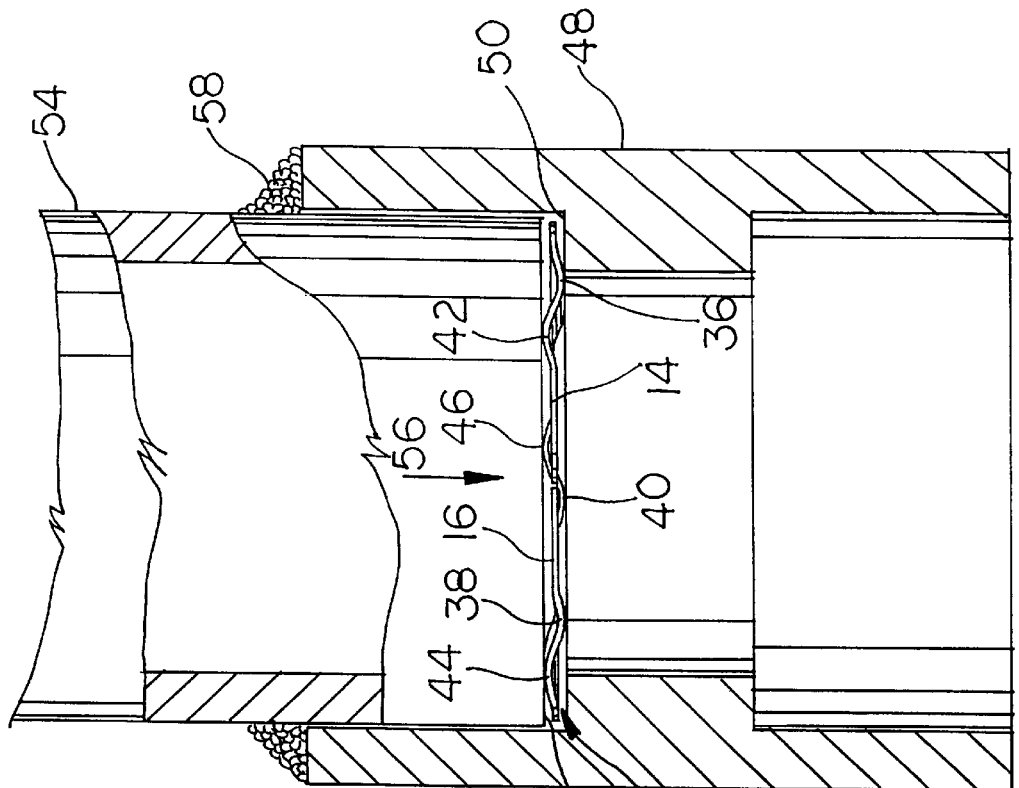
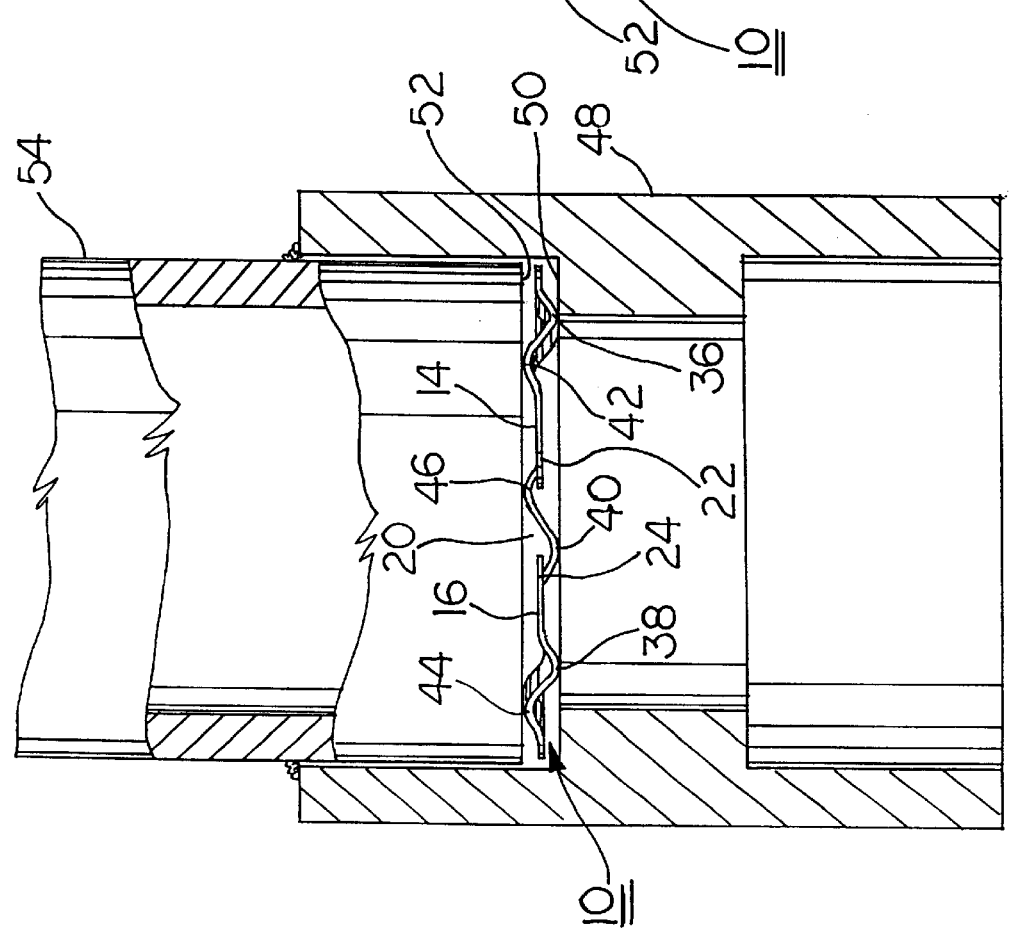

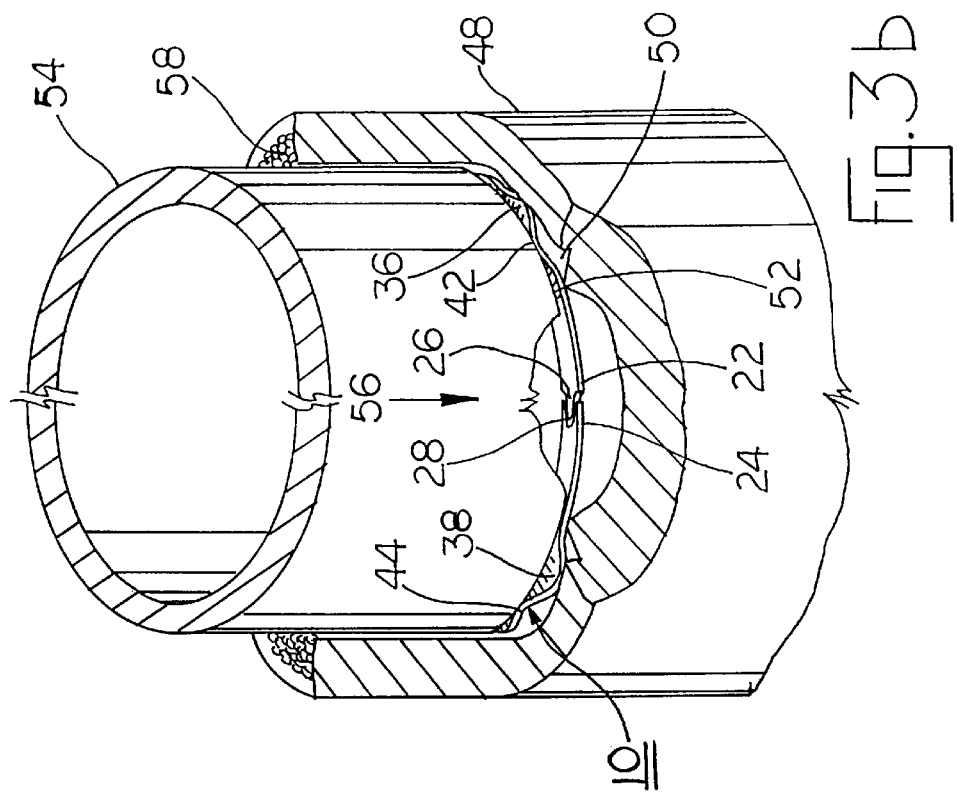
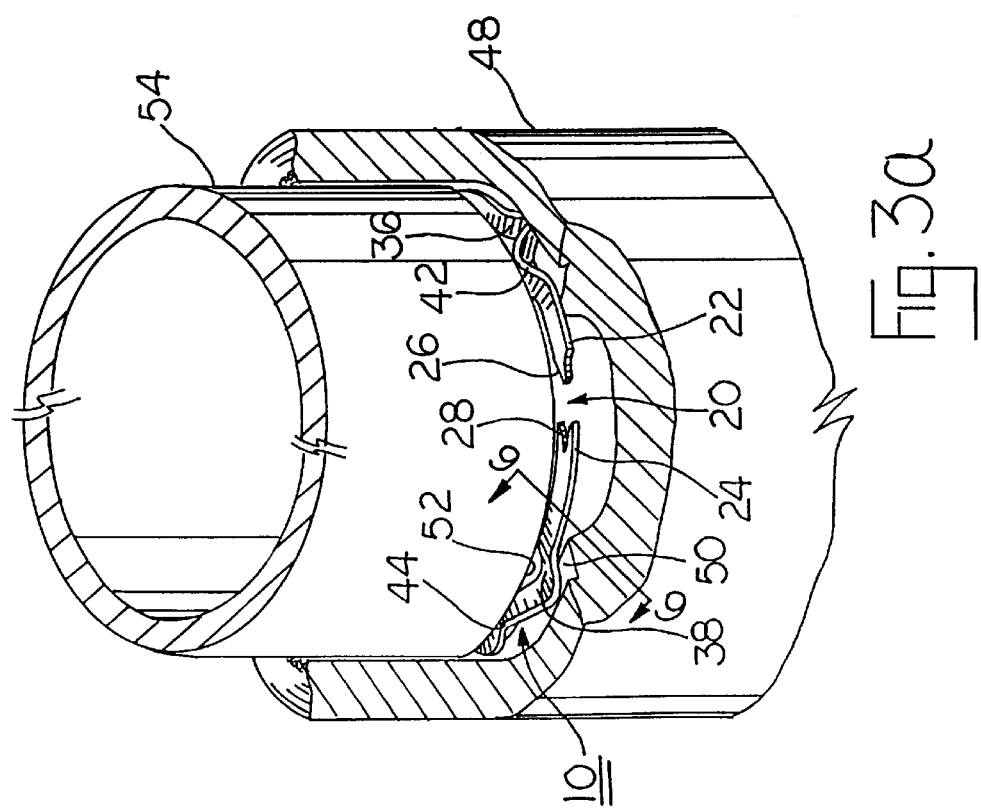

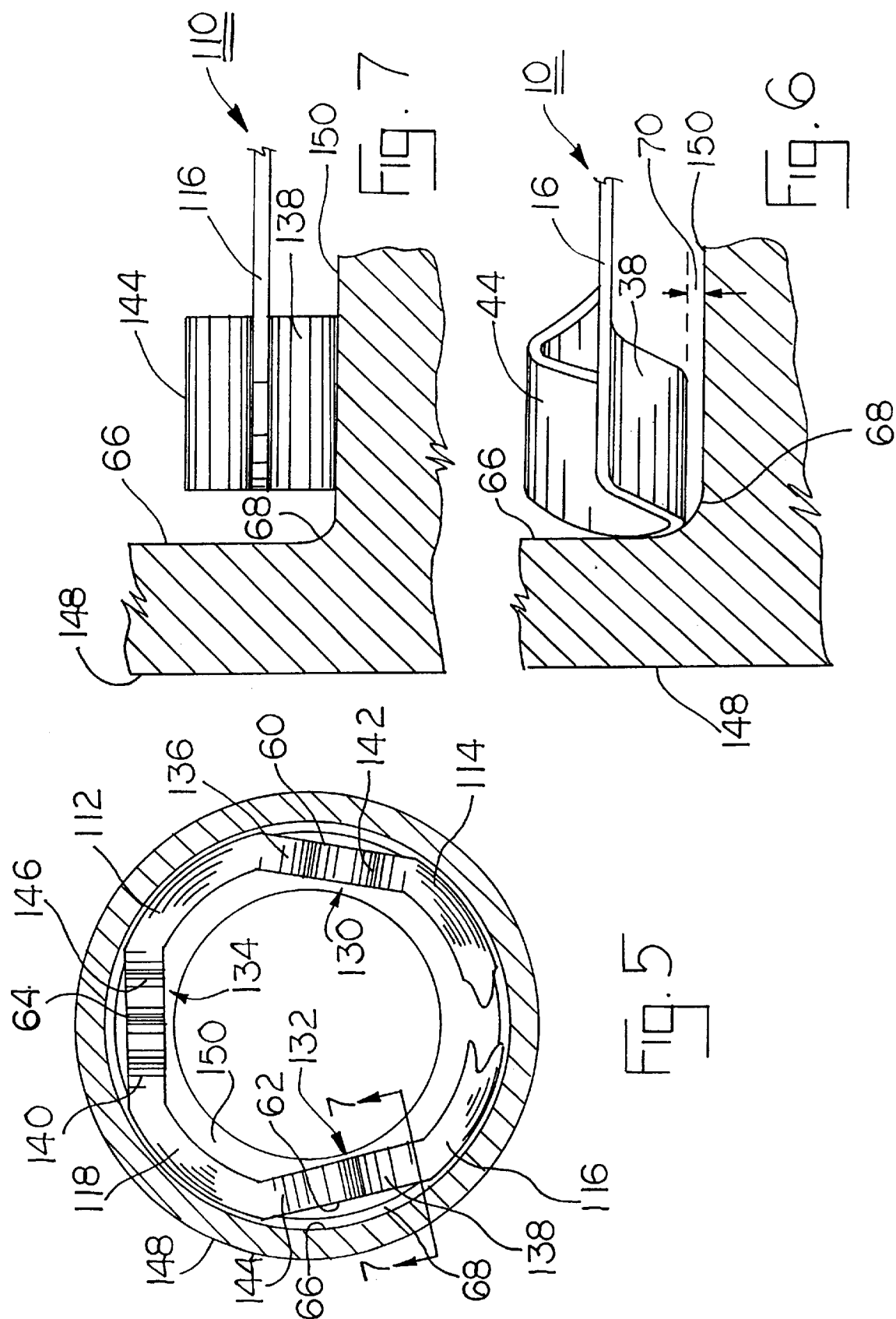

COMPRESSIBLE PIPE SPACER USED IN WELDING

CROSS-REFERENCE TO RELATED APPLICATION

This is a Continuation-in-Part of application Ser. No. 08/590,075 Filed Jan. 17, 1996, now abandoned.

FIELD OF THE INVENTION

This invention relates to a spacer used to separate two pieces of metal which are to be welded together.

DESCRIPTION OF THE RELATED ART

Pipes are commonly welded to fittings having an internal shoulder adjacent the end of the pipe when the pipe is inserted into the fitting. During welding, a predetermined gap between the pipe and the internal shoulder of the fitting must be maintained. However, the pipe expands during welding, and unless the pipe is kept from contacting the fitting shoulder, the expansion can cause the fitting or the weld between the pipe and the fitting to crack. Prior art methods such as shown in U.S. Pat. No. 4,346,918 prevent the pipe from contacting the fitting shoulder by providing a flexible ring spacer which is positioned between the pipe end and the fitting shoulder. The spacer is generally flat, and is split at one point along its body with the spacer ends so formed having faces which are perpendicular to the spacer body and separated from each other. The spacer includes segments or protrusions disposed along the length of the spacer which bulge outwardly in a single direction from the plane of the spacer body. These protrusions abut the surface of the pipe, and the spacer body abuts the fitting shoulder to form a gap between the pipe and the fitting shoulder. During welding, the protrusions are compressed between the expanding pipe and the fitting while maintaining a gap between the pipe and the fitting shoulder.

Although prior art spacers effectively prevent cracking of the fitting and the weld, such spacers have a number of disadvantages. The user must position the spacer in the pipe fitting so that the protrusions, not the spacer body, will contact the pipe end. This positioning is required because occasionally, due to imperfect cutting methods, the cut pipe end is not perpendicular to the longitudinal axis of the pipe, or is irregular due to raised protuberances or burrs, resulting in one or more high points along the circumference of the end. If the spacer protrusions are directed toward the fitting shoulder rather than the pipe end, when such an imperfectly cut pipe end is inserted into the fitting, it is likely that a high point will contact the flat body of the spacer and rock the spacer out of parallel alignment with the shoulder, resulting in an improper initial gap between the pipe end and the shoulder. By directing the protrusions toward the pipe end, the user ensures that the spacer remains aligned with the shoulder and that the raised protrusions will prevent any irregularity or high point on the pipe end from contacting the flat, non-yielding spacer body. Thus, the user is required to check for proper spacer orientation each time a spacer is installed between a pipe and a fitting shoulder.

Stainless steels, such as cold-formed 300 Series Stainless Steel are very susceptible to stress corrosion cracking under certain service conditions. Thus, the relatively large surface area of the flat spacer body which contacts the fitting shoulder is undesirable because a large contacting area increases the likelihood of crevice corrosion and pitting of the spacer and the fitting. Contact between the spacer and the fitting shoulder also interferes with passivation by obstructing flow of the passivating agent between the contacting areas. Moreover, this large contacting area increases the incidence of spacer misalignment caused by dirt interfering between the spacer and the fitting shoulder.

Additionally, when the spacer steel is deformed to create the protrusions on the flat spacer body, residual stress is imparted to the steel. This stress weakens the spacer at the radii between the flat body portions and the protrusions, and can result in stress corrosion cracking under certain service conditions.

Finally, the split in the spacer body must be sufficiently wide to permit circumferential expansion of the spacer without bringing the spacer ends into contact with one another. However, a minimum initial clearance between the spacer ends is desirable because the larger the initial clearance, the higher the risk that the spacer ends will curl into the flow path of the pipe when the spacer expands during welding. Since the flat ends forming the split can not expand beyond the point at which they meet, the initial clearance between the ends must be relatively large.

SUMMARY OF THE INVENTION

According to the present invention, in one embodiment a flexible ring-shaped spacer has circumferentially spaced sets of paired offset segments located along the length of the spacer body. The spacer is planar with the exception of these paired offset segments. Each pair of offset segments defines a pair of axially extending protrusions. One of the protrusions bulges outwardly to contact the pipe end, and the other protrusion bulges outwardly in the opposite direction to contact the fitting shoulder, thereby providing the desired separation between the pipe end and the fitting shoulder. When the pipe expands during welding, both protrusions of each pair of offset segments are compressed resulting in circumferential expansion of the spacer. Further the split in the spacer defines two spaced ends of the spacer. One of the spaced ends is grooved. The other end has a tongue corresponding to this groove. When the spacer expands circumferentially under the compressive force of the expanding pipe, the spaced ends move toward one another to the point where the tongue extends into, but does not contact, the groove.

Another aspect of this invention which can be incorporated into the aforedescribed spacer construction or the spacer construction of U.S. Pat. No. 4,346,918 is the use of spaced flats formed about the outer peripheral edge of the spacer body, preferably each located opposite a protrusion or paired offset segments. Such flats further assure that the contact between the spacer protrusions or segments will occur on the flat of the pipe shoulder.

Yet another aspect of this invention relates to the form of the single protrusion which in this case is truncated. This allows for a circular expansion of the spacer during compression.

Accordingly, it is an object of this invention to provide a spacer that will maintain the proper gap between a pipe and a fitting during welding.

Another object of this invention is to provide a spacer that will prevent cracking of the weld between a pipe and a fitting during welding.

Still another object of this invention is to provide a spacer that maintains the proper gap between a pipe and a fitting during welding regardless of which side of the spacer contacts the pipe end.

Still another object of this invention is to provide a spacer that avoids the corrosive effects of prolonged contact with a pipe or a fitting shoulder.

Yet another object of this invention is to provide a spacer that retains a minimal amount of stress from the forming process to avoid stress corrosion cracking during service.

Still another object of this invention is to provide a spacer that will maintain proper alignment with respect to a fitting shoulder having an uneven or contaminated surface.

Yet another object of this invention is to provide a spacer that will facilitate the passivation of piping systems.

Other objects of this invention will become apparent upon a reading of the following description.

BRIEF DESCRIPTION OF THE DRAWINGS

FIG. 2a is a sectionalized side view of a pipe and a fitting prior to welding with the spacer of FIG. 1 inserted therebetween and the pipe tacked to the fitting.

FIG. 2b is a sectionalized side view of a pipe and a fitting after welding with the spacer of FIG. 1 inserted therebetween.

FIG. 3a is a sectionalized perspective view of a pipe and a fitting prior to welding with the spacer of FIG. 1 inserted therebetween.

FIG. 3b is a sectionalized perspective view of a pipe and a fitting after welding with the spacer of FIG. 1 inserted therebetween.

FIG. 5 is a top view of the second embodiment of the spacer of the present invention inserted into a fitting.

FIG. 6 is a sectionalized side view of the spacer of the present invention taken substantially along line 6—6 of FIG. 3a with the pipe removed from the fitting.

FIG. 7 is a sectionalized side view of the second embodiment of the spacer of the present invention taken substantially along line 7—7 of FIG. 5.

DESCRIPTION OF THE PREFERRED EMBODIMENT

Figure 1:
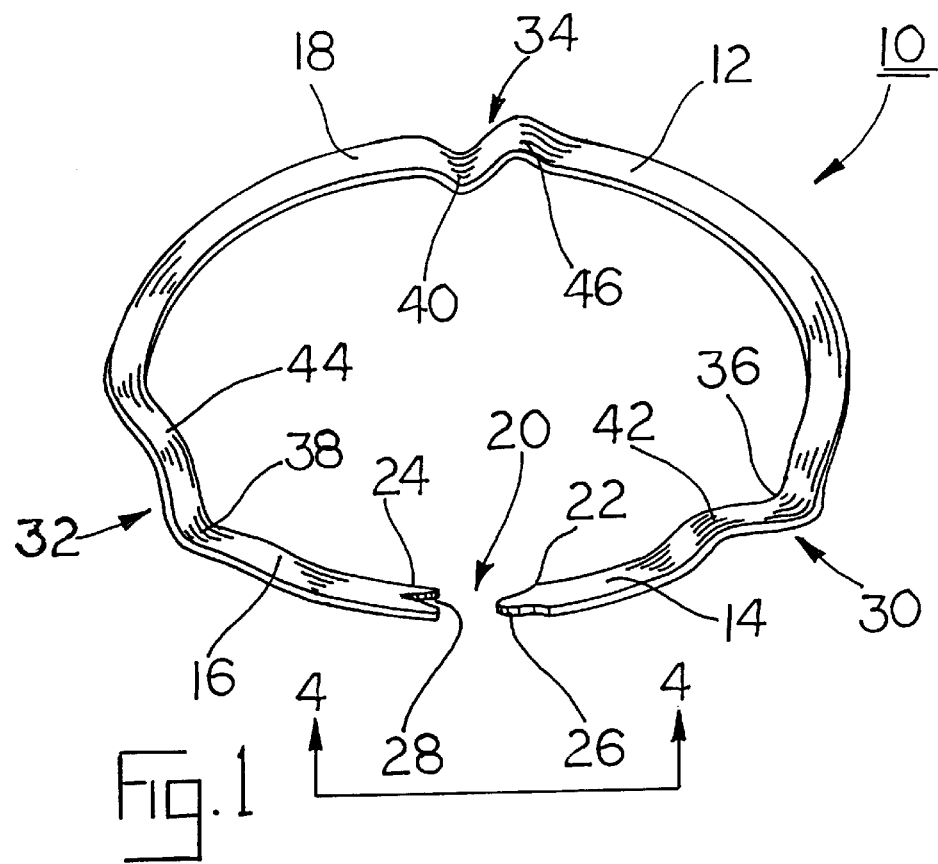
FIG. 1 is a perspective view of the spacer of the present invention.

Referring now to the drawings and particularly to FIG. 1, a pipe spacer generally designated by the numeral 10, includes flattened ring-shaped body portions 12,14,16,18. A clearance 20 is defined between end 22 of body portion 14 and end 24 of body portion 16. End 22 has a tongue 26 extending therefrom. End 24 has a groove 28 which corresponds to tongue 26. Spacer 10 also has a first pair of offset protrusions or segments 30, formed between and interconnecting body portions 12 and 14, a second pair of offset protrusions or segments 32 formed between and interconnecting body portions 16 and 18, and a third pair of offset protrusions or segments 34 formed between and interconnecting body portions 18 and 12. Offset segments 36,38,40 bulge outwardly from spacer 10 in one direction, and the remaining segments 42,44,46 bulge outwardly in the opposite direction. All offset segments 36,38,40,42,44,46 project substantially equal distances from their adjacent body portions 12,14,16,18 of spacer 10. Offset segment pairs 30,32, 34 are spaced at equal angular intervals relative to one another to enable spacer 10 to assume a substantially parallel orientation relative to shoulder 50 between shoulder 50 of fitting 48 and end 52 of pipe 54 as depicted in FIGS. 2a and 2b. Spacer 10 is formed of a flexible material such as stainless steel welding wire so that offset segments 36,38, 40,42,44,46 yield when pipe 54 expands longitudinally as pipe 54 absorbs the heat generated during formation of weld 58.

As illustrated in FIGS. 2a and 3a, spacer 10 is placed into fitting 48 and positioned against shoulder 50. Pipe 54 is then inserted into fitting 48 until pipe end 52 contacts spacer 10, lightly compressing spacer 10 between pipe 54 and shoulder 50. Pipe 54 is lightly tacked to fitting 48 in preparation for welding.

FIGS. 2b and 3b illustrate the relationship between spacer 10 and pipe 54 as weld 58 is formed between pipe 54 and fitting 48. Pipe 54 absorbs heat during such welding and expands in direction 56. This expansion urges pipe end 52 into compressive contact with offset segments 42,44,46. The compression causes offset segments 36,38,40,42,44,46 to partly flatten which results in circumferential expansion of spacer 10. If the welding heat causes significant expansion of pipe 54 in direction 56, the resulting circumferential expansion may cause tongue 26 to expand into groove 28, as best shown in FIG. 3b. However, the initial clearance between ends 22,24, before weld 58 is formed, is sufficient to ensure that, even if offset segments 36,38,40,42,44,46 are fully compressed during welding, tongue 26 of end 22 will not contact groove 28 of end 24 upon circumferential expansion of spacer 10. Additionally, there may be slight diametrical expansion of spacer 10 if an initial diametrical clearance existed between spacer 10 and fitting 48.

The overall height of spacer 10, as measured from the peaks of offset segments 36,38,40 to the peaks of offset segments 42,44,46, is designed to exceed the calculated maximum expansion of pipe 54 and fitting 48 at spacer 10 during welding so that offset segments 36,38,40,42,44,46 will never be compressed far enough to permit non-yielding contact between pipe end 52, spacer 10, and fitting shoulder 50. Thus, even under maximum compression, pipe end 52 and fitting shoulder 50 will not contact spacer body portions 12,14,16,18.

Figure 4:
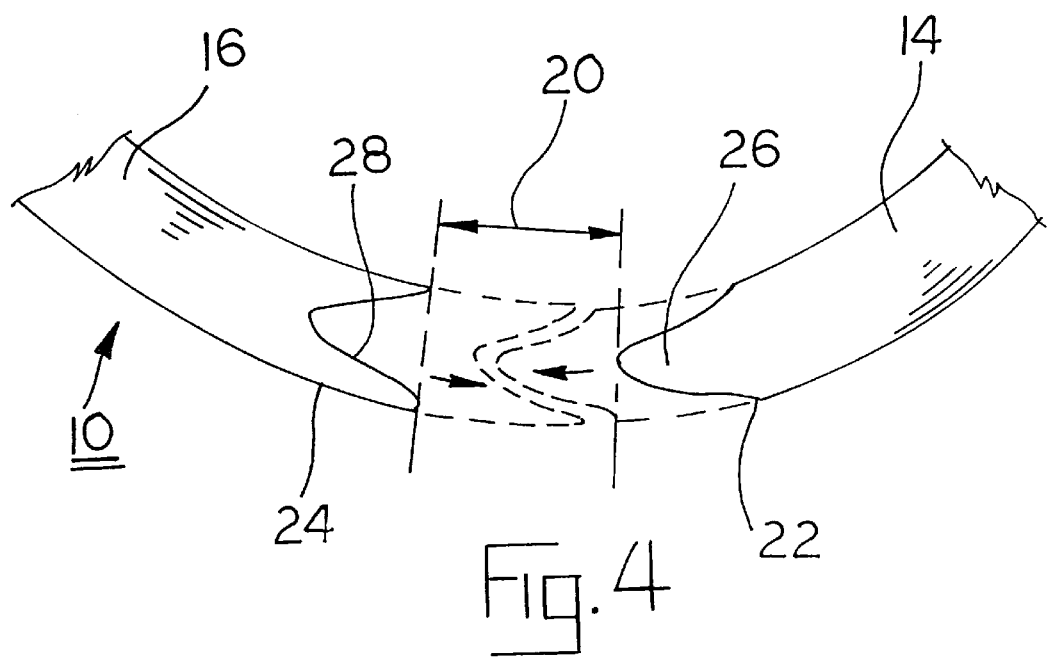
FIG. 4 is a fragmentary side view of the spacer of the present invention taken substantially along line 4—4 of FIG. 1 illustrating in dotted lines the spacer split when the spacer is fully circumferentially expanded.

FIG. 4 illustrates spacer ends 22,24 which form clearance 20. The solid lines show the relationship between tongue 26 and groove 28 before welding as in FIGS. 2a and 3a Clearance 20 is defined by the tip of tongue 26 and the top of the ridges forming groove 28. When spacer 10 elongates under compression of pipe 54 during welding, tongue 26 and groove 28 move toward one another. The dotted lines of FIG. 4 depict the relationship between tongue 26 and groove 28 after welding, under maximum compression, as in FIGS. 2b and 3b. Tongue 26 extends within, but does not contact groove 28. As should be apparent from the drawing, clearance 20 would need to be wider to accommodate the same amount of circumferential expansion if ends 22,24 terminated with flat, perpendicular ends, rather than the tongue-in-groove ends shown in FIG. 4. Thus, by permitting a narrower initial clearance 20, tongue 26 and groove 28 render ends 22,24 less likely to curl into the flow path of the pipe during welding.

From the foregoing, it will also be apparent that it is of no consequence whether spacer 10 is inserted into fitting 48 such that offset segments 36,38,40 contact fitting shoulder 50, as illustrated in FIGS. 2a, 2b, 3a and 3b, or such that offset segments 42,44,46 contact fitting shoulder 50. In either case, the opposing offset segments will contact pipe end 52, thus ensuring an acceptable gap between shoulder 50 and pipe end 52 and a substantially parallel orientation of spacer 10 relative to shoulder 50 even if pipe end 52 is irregularly shaped or is not at a right angle with the longitudinal axis of pipe 54. Thus, the user need not check the orientation of the spacer before installing it into the fitting.

Since in either orientation, pipe end 52 and shoulder 50 each only contact a small area of each of three offset segments, the risk of corrosion is reduced, and the risk of dirt interference between spacer 10 and shoulder 50 is minimized. Finally, since the deformation or stretching required to form sufficiently protruding offset segments to result in a proper gap between pipe end 52 and shoulder 50 is shared equally between the opposed offset segments of each pair, the residual stress of spacer 10 is minimize Referring now to the embodiment of FIGS. 5 through 7, elements the same or substantially the same as those of the embodiment of FIGS. 1 through 3b retain the same reference character, but are increased by 100. Spacer 110 has flats 60,62,64 which correspond with offset segment pairs 130, 132,134. Since all offset protrusions or segments 136,138, 140,142,144,146 are disposed along one of the flats 60,62, 64, the lines of contact between the peaks of offset segments 136,138,140 and shoulder 150 are inset farther from inner wall 66 than the lines corresponding to offset segments 36,38,40 of the embodiment of FIGS. 1 through 3b. This additional clearance ensures that offset segments 136,138, 140 will not be suspended above shoulder 150 by radius 68 which can be formed between inner wall 66 and shoulder 150 when the tools used to form shoulder 150 become worn. As illustrated in FIGS. 5 and 6, flats 60,62,64 thereby avoid spacing error 70, which can accumulate when a series of pipes are welded to extend in one direction, and permit spacer 110 to define a constant, predetermined space between the peaks of offset segments 142,144,146 and shoulder 150, even when radius 68 is present. Such flats can also be incorporated into the spacer disclosed in U.S. Pat. No. 4,346,918 at each spaced offset segment or protrusion.

Figure 8:
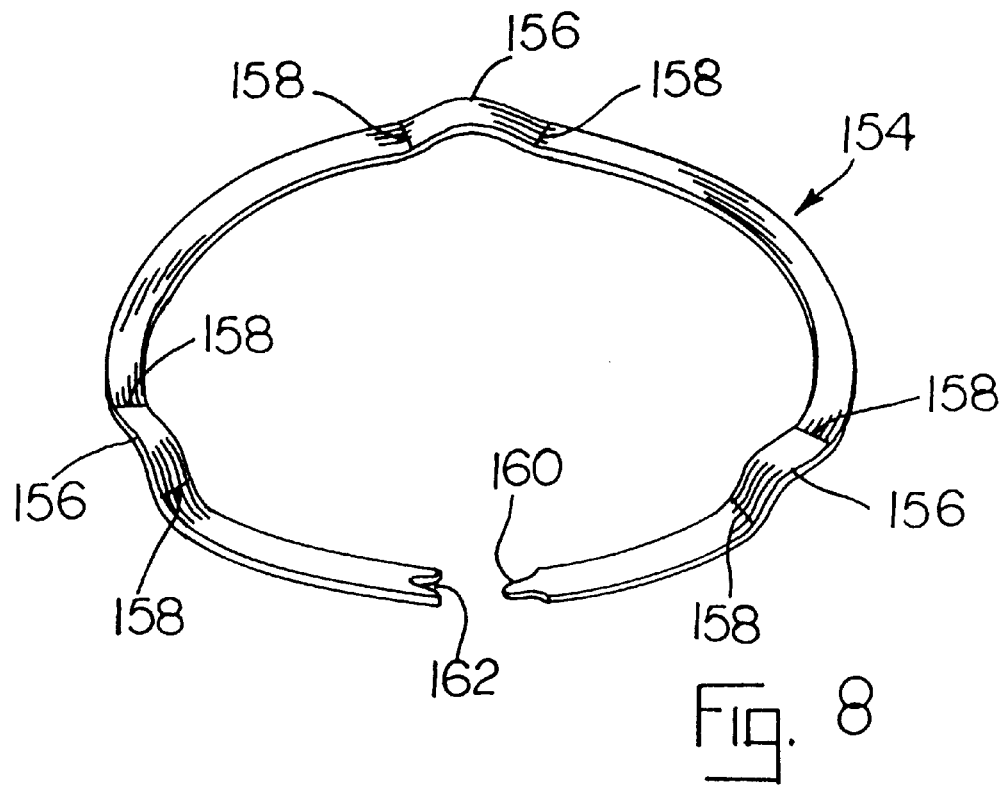
FIG. 8 is a perspective view of another embodiment of the spacer of the present invention.
Figure 9:
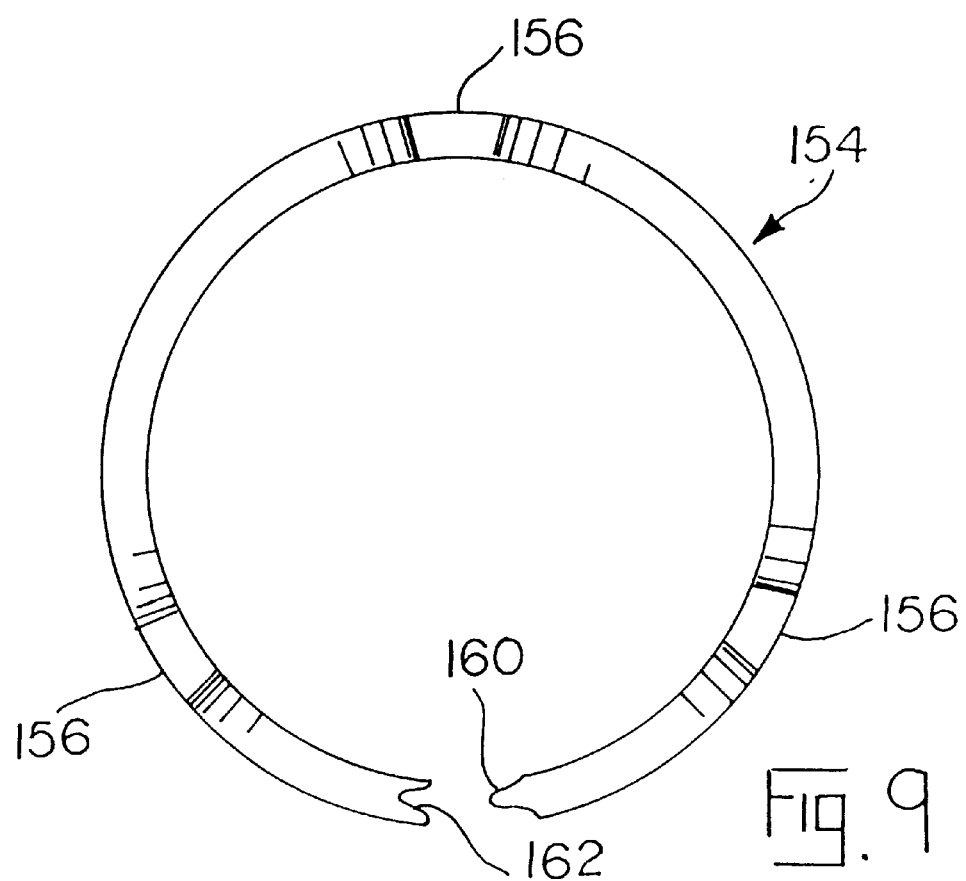
FIG. 9 is a top view of the spacer of FIG. 8.

Referring to the embodiment of FIGS. 8 and 9, the spacer 154 shown has each of its segments or protrusions 156 formed into a truncated shape with tapering sides 158 angled toward the geometrical center of the spacer. The ends of spacer 154 are formed into a spaced tongue 160 and groove 162. With this form of segment or protrusion, the outermost peripheral margin of the spacer will expand to a greater extent than the innermost peripheral margin so as to maintain the spacer's circular shape and thereby its proper orientation within the fitting during compression.

It is to be understood that the invention is not limited to the details provided above, but may be modified within the scope of the appended claims.

I claim:

1. A spacer for positioning between an end of a pipe and an internal annular shoulder of a fitting into which the pipe end is inserted prior to welding the pipe to the fitting, said spacer comprising:

a resilient metal member for positioning between the pipe and the shoulder for controlling the gap therebetween having an outer diametrical dimension approximating the outer diametrical dimension of the pipe, said member having circumferentially spaced ends defining a clearance therebetween, circumferentially spaced body portions, and a pair of axially offset segments between said body portions, said segments projecting from said member in opposite axial directions, whereby one of said segments is adapted to engage the pipe end and the other said segment is adapted to engage the shoulder, said member being sufficiently resilient to prevent unyielding abutment between the pipe end and the spacer when the pipe expands during welding.

2. Spacer as set forth in claim 1 wherein said offset segments project equidistantly from said member.

3. Spacer as set forth in claim 1 wherein said member includes a multiple of said pairs of offset segments disposed on said member in spaced angular intervals.

4. Spacer as set forth in claim 1 wherein said one segment is contiguous to said other segment with said segments together having a substantially sinusoidal longitudinal cross-section.

5. Spacer as set forth in claim 1 wherein one of said spaced ends has a protrusion extending therefrom and the other of said ends has a depression therein adapted to receive said protrusion when said spacer expands circumferentially during welding.

6. A spacer for positioning between an end of a pipe and an internal annular shoulder of a fitting into which the pipe end is inserted prior to welding the pipe to the fitting, said spacer comprising:

a resilient member for positioning between the pipe and the shoulder for controlling the gap therebetween having an outer diametrical dimension approximating the outer diametrical dimension of the pipe, said member having circumferentially spaced ends defining a clearance therebetween, circumferentially spaced body portions, and a pair of axially offset segments between said body portions, said segments projecting from said member in opposite axial directions, whereby one of said segments is adapted to engage the pipe end and the other said segment is adapted to engage the shoulder, said member being sufficiently resilient to prevent unyielding abutment between the pipe end and the spacer when the pipe expands during welding, said member including a multiple of said pairs of offset segments disposed on said member in spaced angular intervals, said member being generally ring-shaped except for a multiple of flats.

7. Spacer as set forth in claim 6 wherein each of said pairs of offset segments is disposed on a respective one of said multiple of flats.

8. Spacer as set forth in claim 7, said member having one outer radial dimension at said offset segments and another outer radial dimension at said body portions, said one radial dimension being smaller than said other radial dimension.

9. A spacer for spacing a pipe end from an internal annular shoulder of a fitting into which the pipe end is inserted prior to welding the pipe to the fitting, said spacer being annular and having an outer diametrical dimension approximating the outer diametrical dimension of the pipe, said spacer further comprising:

a plurality of spaced apart elongated, flattened body portions lying in substantially the same plane, two of said body portions having ends;

a plurality of offset segments offset axially from said flattened body portions, each of said offset segments being disposed between two of said flattened body portions thereby connecting said two body portions, said segments being sufficiently yieldable to partly flatten under the compressive force of the pipe end when the pipe expands during welding; and a clearance defined by said ends of said two spaced apart body portions, said clearance thereby accommodating circumferential expansion of said spacer when said offset segments are partly flattened, one of said ends having a tongue part extending therefrom and the other of said ends having a grooved part therein adapted to receive said tongue when said spacer circumferentially expands during welding.

10. Spacer as set form in claim 9 wherein said protrusion forms a tongue and said depression defines a groove.

11. Spacer as set forth in claim 9 wherein said offset segments are paired with each pair protruding in opposite directions equidistantly from said plane of said elongated, flattened body portions.

12. Spacer as set forth in claim 9 wherein said offset segments are disposed on said member in spaced angular intervals.

13. A spacer for positioning between an end of a pipe and an internal annular shoulder of a fitting into which the pipe end is inserted prior to welding the pipe to the fitting, said spacer comprising:

a resilient member for positioning between the pipe and the shoulder for controlling the gap therebetween having an outer diametrical dimension approximating the outer diametrical dimension of the pipe, said member having circumferentially spaced ends defining a clearance therebetween, circumferentially spaced flattened body portions, and a plurality of spaced axially offset segments between said body portions, said segments projecting from said body portions, said segments being sufficiently resilient to prevent unyielding abutment between the pipe end and spacer when the pipe expands during welding, said member being generally ring-shaped except for a multiple of flats.

14. The spacer as set forth in claim 13 wherein each of said segments is disposed on a respective one of said multiple of flats.

* * * * *